Figure 1:
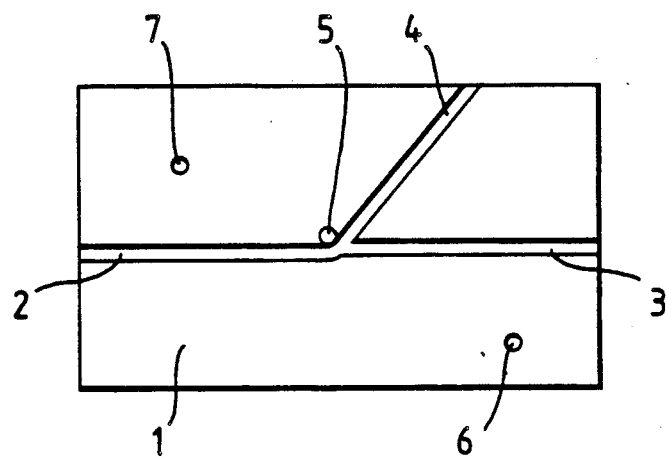

United States Patent [19]

Cox et al.

[11] Patent Number: 4,989,939
[45] Date of Patent: Feb. 5, 1991

[54] COUPLER FOR OPTICAL FIBERS

[75] Inventors: Eric R. Cox, Chester, England; Philippe J. C. Leliaert, Maldegem, Belgium

[73] Assignee: Imperial Chemical Industries plc, London, England

[21] Appl. No.: 358,507

[22] Filed: May 30, 1989

Related U.S. Application Data

[63] Continuation of Ser. No. 744,270, Jun. 13, 1985, abandoned.

[30] Foreign Application Priority Data

Jun. 21, 1984 [GB] United Kingdom ............... 8415890
Jan. 31, 1985 [GB] United Kingdom ............... 8502451

[51] Int. Cl.⁵ ........................ G02B 6/26; G02B 6/42
[52] U.S. Cl. ............................................. 350/96.15
[58] Field of Search ....................... 350/96.15, 96.20

[56] References Cited

U.S. PATENT DOCUMENTS 4,601,541 7/1986 Shaw et al. .................. 350/96.15
4,676,584 6/1987 Perlin ........................... 350/96.15

Primary Examiner—William L. Sikes
Assistant Examiner—Robert E. Wise
Attorney, Agent, or Firm—Cushman, Darby & Cushman

[57] ABSTRACT

A non-invasive optical coupling device comprises means to hold an optical fibre while bending it with a radius of curvature sufficiently small to cause light to leak through the cladding, and means to hold a tap fibre in a predetermined position to receive at least a portion of the light leaking from the main fibre. This device enables light sources, sensors and various other optical communications devices to be connected via tap fibres to ring main fibres and data buses, without degradation of the fibres to which the tap fibres are connected.

4 Claims, 4 Drawing Sheets

COUPLER FOR OPTICAL FIBERS

This is a continuation of application No. 06/744,270, filed June 13, 1985, now abandoned.

This invention relates to the field of fibre optics and in particular to non-invasive coupling of optical fibres to enable light to be transferred from one or more fibres to one or more other fibres.

Optical fibres consist essentially of a transparent core surrounded by a cladding of lower refractive index than the core to provide consistent propagation of light along the fibre by total internal refelection. Around each fibre or bundle of fibres are usually one or more protective sheaths. In various optical fibre communication applications it is desirable to transfer a predetermined portion of light travelling along one fibre (the "main fibre") to one or more other fibres ("tap fibres"), or likewise to feed light from the tap fibres into the main fibre. Various invasive couplers are known, but these require substantial skills, e.g. to remove cladding and fuse individual cores together in a carefully controlled manner, or to be inefficient, e.g. through loss of light were fibres are broken and connected to a preformed coupling device.

According to the present invention a device for optically coupling a main fibre to at least one tap fibre having a light receptive portion comprises means to hold an intermediate portion of the main fibre and to conform it to a predetermined path which executes a bend having a radius of curvature sufficiently small to cause some of any light flowing through the main fibre to leak from the cladding around the outer edge of the bend, and means to hold the tap fibre with its light receptive portion positioned to receive at least a portion of the light leaking from the cladding around the outer edge of the bend.

We find that by bending the supply fibre sufficiently to obtain a substantial leakage of light (determinable by measuring the accompanying decrease in the amount of light transmitted) by clamping or otherwise securing the two fibres accurately in predetermined positions, very reproducible proportions of light in the supply fibre can be bled into the tap fibre. Moreover, our preferred devices according to this invention can achieve such reproducibility with very high efficiencies, and, as the technique is non-invasive, the main fibre remains continuous throughout its passage therethrough with no more preparation required than removal of a small area of any protective layers it may have (but not of cladding). This can be achieved by factory floor mechanics without specialist fibre optic skills, and can be achieved without any residual damage to the otpical fibre.

A simply constructed device according to the invention is one for use with at least one tap fibre having an end portion in which the light receptive portion is in the form of an exposed end face, the means for holding the tap fibre comprising means to hold the end portion thereof with its exposed end face adjacent to the outer surface of the bend in the main fibre thereby to enable it to receive portions of light leaking from the bend when light is passed through the main fibre.

A preferred three port coupler is one in which the means for holding the main fibre comprises a first assembly having a mating surface and the means for holding the tap fibre comprises a second assembly lockable in a predetermined position against the mating surface, the configuration of the first assembly being such as to hold the main fibre with its cladding on the outer surface of the bend lying flush with the mating surface, whereby removal of any protective layers proud of the mating surface will expose said cladding. The first assembly could be formed of a single block drilled to accommodate the main fibre, but we prefer it to be splittable to provide opposing cleavage faces at least one having a configuration for receiving and holding the main fibre in a predetermined position, e.g. by having a channel or series of pegs into or around which the fibre may be located, thereby to facilitate assembly, the two parts interlocking or being hinged or otherwise held together to provide a secure assembly. For convenience we prefer to provide the second assembly with a stripping blade which can be slid along the mating surface to strip the protective layers from the bend in the main fibre, and hence avoid any need for the operator to have his own separate stripper. A particularly preferred device is one in which the second assembly is locked in the predetermined position by sliding it along the mating surface, the stripping blade being located ahead of the tap fibre in the direction of sliding whereby stripping of any protective layers proud of the mating surface is effected automatically when locking the two assemblies together.

This three port device is preferably proportioned such that when light travelling through the main fibre approaches the bend along a first axis, the end portion of the tap fibre is held along a second axis approximately parallel to the first axis (e.g. +20°), but displaced from the first axis in the same direction as the bend in the main fibre. This displacement is preferably small, i.e. less than the diameter of the supply fibre. The tap fibre will then normally only receive light from the main fibre when that light has travelled along the main fibre towards the bend along said first axis and not from the other direction. When the axes are displaced in this manner, we prefer the exposed end face to be set at an acute angle to the main axis of the tap fibre it terminates, preferably within the range 15 to 35°. These variable parameters, i.e. end face angle, axis displacement and interaxis angle, are all interrelated in their effects on the efficiency of the device, and the selection of specific values for each will affect the optimum values for the other two.

Besides the above three port coupler, another particularly useful device for coupling tap fibres through exposed end faces, is a directional four port coupler comprising means to hold two tap fibres with their exposed end faces adjacent to the outer surface of the bend in the main fibre but positioned substantially symmetrically with respect to said bend thereby to enable each to receive light travelling along the main fibre in the opposite direction to that received by the other fibre. Light injected through the two tap fibres would likewise be caused to travel along the main fibre in opposite directions, and light injected by one would travel along the main fibre in the same direction as light which can be accessed by the other. Such a device thus provides a very convenient way of coupling a communications station non-invasively into a ring main or data bus communications link, having a detector connected by one tap fibre and a source (with its attendant modulator) connected to the other.

The amount of light which is caused to leak through the cladding of the main fibre depends on the radius of curvature of the bend, the smaller the radius of curvature the greater is the amount of light leaked. Hence, for example, to divide the light into two equal portions (although smaller through losses), requires a bend having a smaller radius of curvature than when only one tenth of the supply is required to be tapped. However, the actual curvature required will depend on the size and construction of the fibre, but will in any case be substantially smaller than the normal minimum radius usually quoted in respect of commercial fibres. For example, for dividing the light into two equal parts, the radius of curvature may typically be about 2 mm, and it is desirable to use such devices with optical fibres which do not degrade through stress cracking under such circumstances. In general, therefore, we prefer to use these devices with polymer fibres (e.g. clad polymethylmethacrylate fibres) rather than glass fibres, although some glass fibres seem to withstand such bending.

The angle through which the main fibre is bent is a factor in the overall efficiency, in that the larger the angle the wider is the spread of leaked light, and the smaller is the portion of light that can be caught by the fibre. However, at lower angles, especially below about 20°, very little light will be leaked. Thus although there are no precise limits to the range of bend angles that will leak light (given a sufficiently small radius of bend curvature) a practical range is about 20 to 90°, with our preferred range being 35 to 50°.

It should be noted here that where an apparatus comprises several such devices with a plurality of tap fibres extracting light from a common main fibre, these may be arranged so close together that their respective bends in the main fibre are merged into a single extended bend. Under these conditions the bend may extend to angles even greater than 90° as the light which could not be caught by a single tapping fibre becomes available for the adjacent tapping fibres arrayed around the extended bend, and thereby maintains good efficiency.

Efficiency can also be improved by providing index matching gel between the bend and the light receptive portion and heat treating the supply fibre at the bend to anneal the fibre may also improve efficiency.

It is not essential to use a preformed light-receiving portion, as this can be formed in situ in non-invasive manner by bending an intermediate portion of the tap fibre in essentially the same manner as the main fibre. This can be achieved in a device in which the means for holding the tap fibre is designed to cause an intermediate portion of the tap fibre to conform to a predetermined path which executes a bend having a radius of curvature sufficiently small to cause some of any light flowing through the fibre to leak from the cladding around the outer edge of the bend, and to hold adjacent to each other the outer edges of the bends in the two fibres whereby light leaked from one fibre can be caught by the other. As may be realised, in such a configuration there need be no asymmetry to identify one fibre as the main fibre and the other as the tap.

Figure 2:
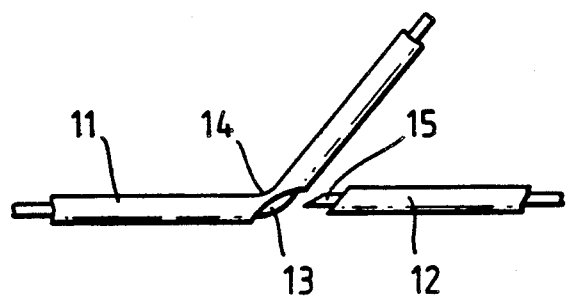
Figure 3:
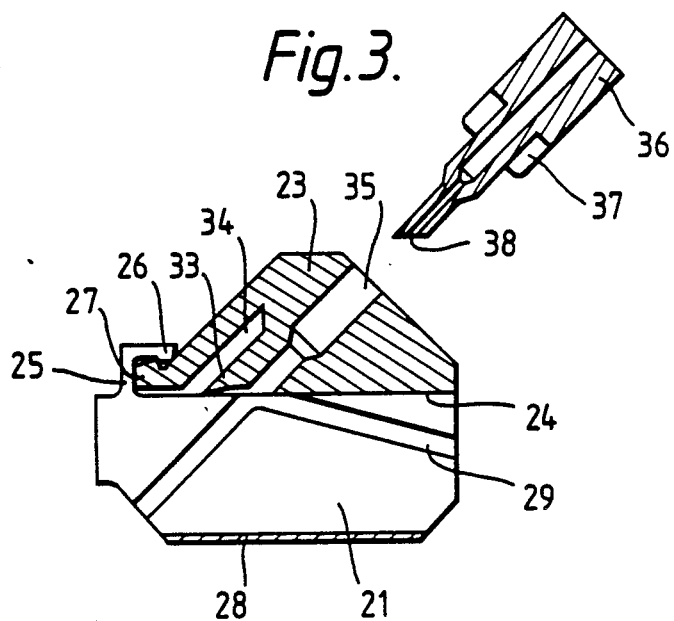
Figure 4:
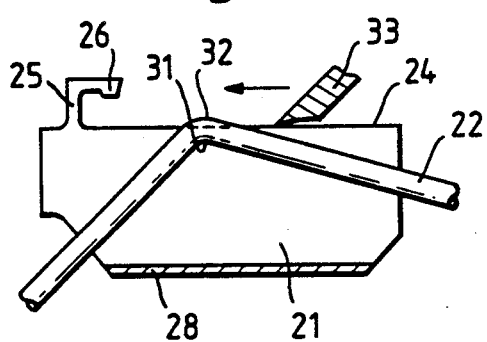
Figure 5:
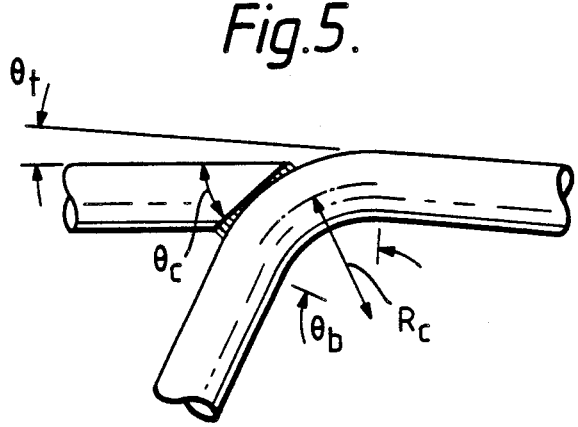
Figure 5A:
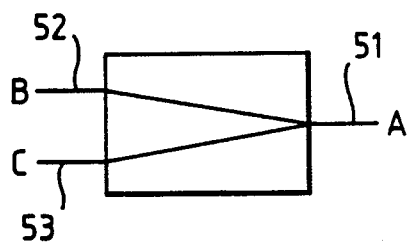
Figure 5B:
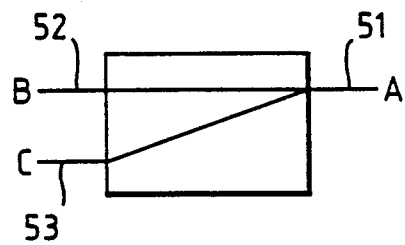
Figure 6:
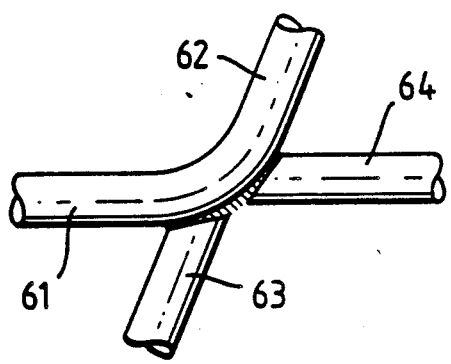
Figure 6A:
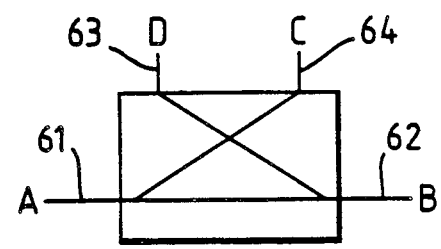
Figure 7:
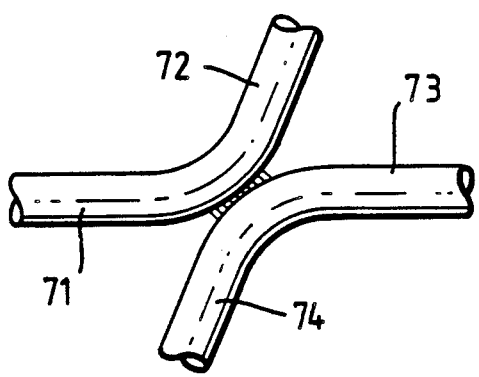
Figure 7A:
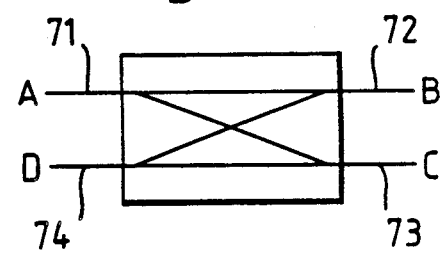
Figure 8:
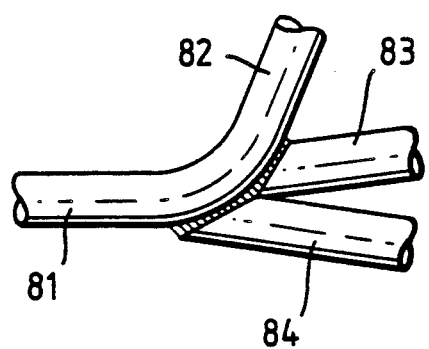
Figure 8A:
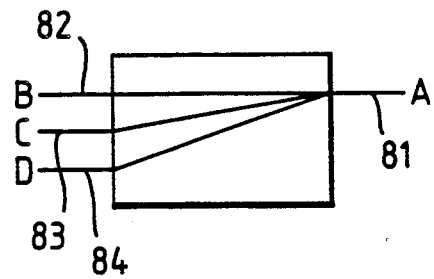
Figure 9:
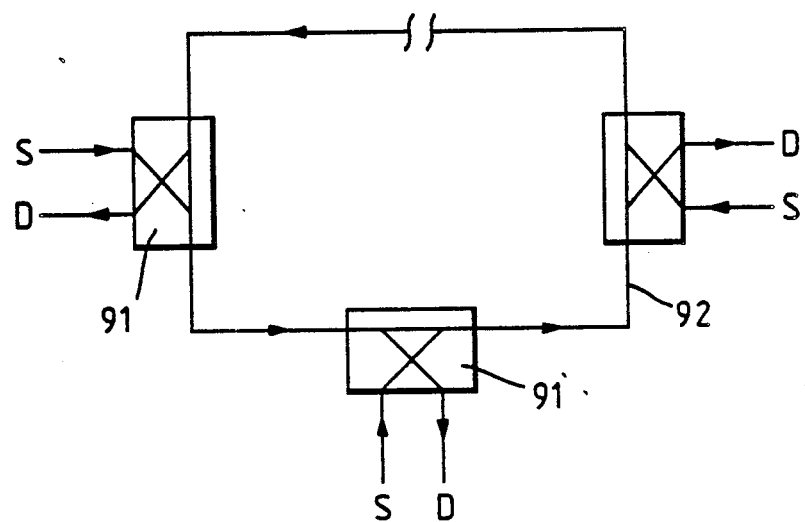
Figure 10:
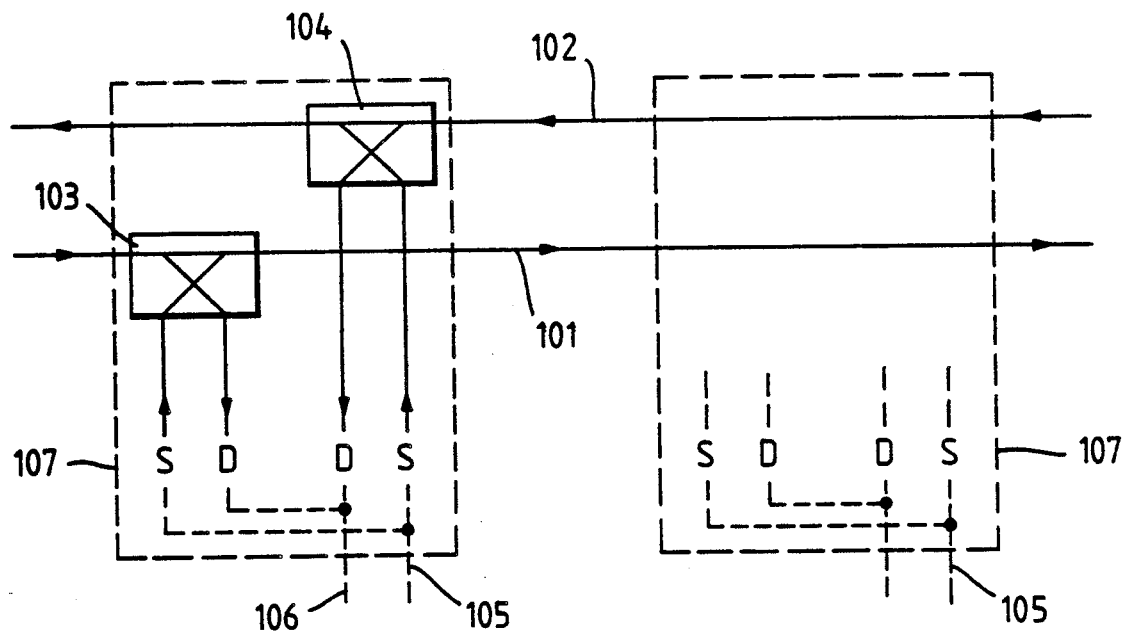

The invention is illustrated by reference to specific embodiments shown in the drawings, in which FIG. 1 shows in elevation a body portion of one embodiment from which a cover plate has been removed to show internal details, FIG. 2 shows a main fibre and a tap fibre in positions corresponding to those in which they are held in use, but spaced apart slightly for clarity, FIG. 3 is a longitudinal section through an assembled coupler with a tap plug poised for insertion, FIG. 4 shows part of the coupler of FIG. 3 holding a main fibre, FIGS. 5, 6, 7, and 8 show various arrangements of fibres as they can be held in appropriate three and four port couplers according to the invention, FIGS. 5a, 6a, 7a, and 8a, and 5b are diagrammatic representations showing how the coupler forming the configuration of FIGS. 5–8 can be used in practice, FIG. 9 shows how a plurality of the couplers of FIG. 6 can be used in a unidirectional communications ring main, and FIG. 10 shows how they can be used in a bidirectional data bus.

The body portion 1 shown in FIG. 1 is fabricated from a block of polymethyl methacrylate, in the surface of which are milled three interconnecting channels, 2.2 mm wide and deep. Of these a first channel 2 has an axis which is parallel to but displaced by a very small amount (e.g. by 0.2 to 0.5 mm for this size of fibre) from that of a second channel 3. The third channel 4 is formed at an angle of 50° to the other two, and the inside edge of the obtuse angle formed between the first and third channels has an accurately formed 1 mm radius of curvature, provided by inserting a 2 mm diameter rod 5 after milling of the channels. The cover plate (not shown) is simply a flat plate of polymethylmethacrylate which is bolted to the body portion through holes 6, 7 thereby closing off the three channels to form tubes.

The optical fibres 11, 12 of FIG. 2 are 1 mm diameter polymethyl methacrylate fibres coated with fluoropolymer cladding, and around this is a protective sheath, giving a total diameter of about 2.2 mm. In use the main fibre 11 has a portion of protective sheath removed to expose the fibre 13, complete with its cladding. It is then fitted into the first and third channels thereby forming a tight bend 14 around the rod 5 with the exposed portion of cladding forming the outer side of the bend. The tap fibre 12 has an exposed end portion 15 slanted at an angle of 30°, and is pressed into the second channel with the slanting end face facing upwards in the illustrated orientation, and located adjacent to the outer side of the bend in the main fibre, this being formed by the exposed cladding 13. All the space within the junction of the channels is then filled with index matching gel, this being an option to improve efficiency. The cover plate is then bolted onto the front of the body portion to hold the fibres in place.

Although this embodiment has been described as carried out in a particular order, this order need not be adhered to, and where a sensor or other optical device is to be provided with light from a ring main fibre via a tap fibre, it could well be marketed with a device according to the invention already secured to the end of the tap fibre, ready to be clamped on an optical fibre ring main at the point of use. This provides a substantial practical advantage over other coupling devices for such an application in that because there is no need to break into or otherwise degrade the main fibre, the point of use can easily be moved along supply fibre as required, without any loss of efficiency.

Although this embodiment has been described in terms of removal of light from a ring main, it can also be used as a feeding coupler, for supplying light to the ring main via the tap fibre. The following two Examples are provided to illustrate how this kind of embodiment can be used in practice and to give results we have obtained with two such devices.

EXAMPLE 1

A coupling device for tapping out half of the light in a main fibre, was assembled as described in respect of the above specific embodiment, with the main fibre being bent through 50° around a 2 mm diameter rod, giving a radius of curvature at the centre of the core of about 2 mm, and using a gel of refractive index 1.46. When 1 mW of visible light was fed into the supply fibre where it extended from the first channel, and about 400 μW of light emerged from the other end of the main fibre and also from the tapping fibre. This gave an excess loss of less than 1.5 dB.

EXAMPLE 2

A further device was assembled which was substantially the same as that used in the preceeding example except that the main fibre was bent through 40° around a curvature-defining rod of 10 mm diameter. This gave a radius of curvature at the centre of the core of about 6 mm. This greater radius of curvature caused less light to leak, and the ratio of light emerging from the tap fibre to that continuing along the main fibre was only about 1:10, that emerging from the main fibre being about 750 μW and that from the tap fibre about 75 μW. The excess loss was thus less than 1 dB.

FIGS. 3 and 4 show an injection moulded three port coupler comprising a first assembly 21 for holding a main fibre 22 and a second assembly 23 for holding a tap fibre (not shown). The first assembly has a mating surface 24 with two longitudinal under cut ridges and the second assembly is correspondingly shaped with grooves (not shown) to receive the ridges and enable one to slide along the other while holding the second assembly against the mating surface of the first. At one end is an end stop 25 with an integral resilient latch 26, such that when the second assembly is slid along the first until it abuts the end stop 25, the latch on the latter engages a latching recess 27 on the former, and thereby locks the two assemblies together.

The first assembly is split longitudinally with an integral hinge 28 along one edge. In one part is a channel 29 to receive the optical fibre 22, and the other part locks against it to hold the fibre securely in place. The channel has two straight portions meeting at an angle at the mating surface. The fibre is shown only in FIG. 4, and this has been provided to show how the fibre (complete with its protective sheath) is held by the channel with a tight bend 31, the protective sheath 32 around the bend standing proud of the mating surface. In the second assembly there is also formed an integral stripping blade 33 (shown in isolation in FIG. 4) which slides along the mating surface during assembly of the coupler and strips the protective sheath from the fibre around the bend, so as to expose the cladding. Ahead of the blade is a recess 34 to receive the stripped sheath material.

The second assembly has a passage 35 drilled through it at an angle, parallel to one of the arms of the channel in the first assembly, the two being very nearly coaxial, as shown in FIG. 3 and in the prototype shown in FIG. 1. The passage is drilled to receive a plug 36 of varying diameter (this being a third plastics moulding), which in turn is drilled to receive a tap fibre (not shown) with its sheath removed from its end portion to fit the plug. Extending on both sides of the plug are latching plates 37 which, when the plug is inserted into the assembly, lie on either side of the latter, locking the plug into position and preventing it rotating. The narrow end of the plug has a slanting end face 38, and the tap fibre is shaped to lie flush with this. When the plug is located in the assembly, it holds its end face and hence also the end of the tap fibre against the exposed cladding of the main fibre.

FIG. 5 shows a main fibre 51,52 and a single tap fibre 53, held as described above in connection with FIGS. 1-4, but showing variable parameters which can be preselected, according to the configuration of the coupler, to provide the desired characteristics, e.g. a 1/1 splitter or a 10/1 splitter, the figures representing the relative proportions of light output, ignoring inherent losses. In the drawing the shaded portion represents index matching gel, and the variable parameters are as follows $\theta_b$: bend angle
$R_c$: radius of curvature
$\theta_c$: end face angle
$\theta_f$: viewing angle Such three port couplers can be used as a splitter or as a combiner, and this can be represented as shown in FIGS. 5a and 5b. When the above variable parameters are selected to give a 50/50 split, typical results are as follows:

As a splitter:

| | |
|---|---|
| A to B | 38% |
| A to C | 38% |
| Total | 76% |

Excess loss is typically 1.2 dB.
As a combiner, inputting 100% at B and at C
B to A: 40%
C to A: 40%
(crosstalk) B to C and C to B: less than −25 dB.

When used as a 10% tap as shown in 5b, typical results are

| | |
|---|---|
| A to B | 73% |
| A to C | 7% |
| Total | 80% |

Excess loss is typically 1.0 dB.

FIG. 6 shows a main fibre 61,62 and two tap fibres 63,64 held in a directional four port coupler, of which there appears to be no known equivalent among conventional couplers for glass fibres. This coupler is shown diagrammatically in FIG. 6a, typical results being as follows

| With 100% input of A : | | With 100% input at D: | |
|---|---|---|---|
| A to B | 62% | D to A | <0.5% (crosstalk) |
| A to C | 16% | D to B | 10% |
| A to D | <0.5% (crosstalk) | D to C | <1% (crosstalk) |
| | 78% | | 10% |
| excess loss = 1.1 dB | | total loss = 10.0 dB | |

Such directional couplers are particularly suitable for use with a communication ring main (local area network), to inject light into and tap light from the optical ring main. So far we have effectively used up to eight such couplers around a single ring main, for transferring data between various peripherals and the ring main.

FIG. 7 shows a main fibre 71,72 and two tap fibres 73,74 formed from the same fibre, held in the configuration of a transmissive star coupler. This configuration is symmetrical, there being no essential difference between the main fibre and the fibre forming the taps. This coupler is shown diagrammatically in FIG. 7a, and has essentially the same configuration and the same effect as known star couplers designed for coupling the ends of four glass fibres, except that this is non-invasive, the two fibres being removable from the coupler without any optical deterioration, the only loss being of a short length of protective sleeve. Typical results are as follows, when 100% of light is input at A:

| A to B | 67% |
|---|---|
| A to C | 5% |
| A to D | $\leq 0.1\%$ (crosstalk) |
| | 72% |
| excess loss = 1.4 dB | | excess loss = 1.4 dB

FIG. 8 shows a multiple tap, with a main fibre 81,82, and two tap fibres 83,84 positioned and aligned so that both will receive light that has approached the bend from the same direction, i.e. along portion 81 of the main fibre and not along portion 82. This is also shown diagrammatically in FIG. 8a, and it can be used as a splitter, e.g. as a demultiplexer, or as a combiner, e.g. as a multiplexer. Typical results are as follows, where each input is 100%.

| Splitter (demultiplexer) | |
|---|---|
| A to B | 40% |
| A to C | 20% |
| A to D | 20% |
| | 80% | excess loss = 1.0 dB

| Combiner (multiplexer) | | | |
|---|---|---|---|
| B to A | 40% | C(D) to A | 20% |
| B to C | $\leq 0.35\%$ (crosstalk) | C(D) to B | $\leq 0.1\%$ (crosstalk) |
| B to D | $\leq 0.35\%$ (crosstalk) | C(D) to D(c) | $\leq 0.1\%$ (crosstalk) |
| | 40% | | 20% |
| total loss = 4.0 dB | | total loss = 7.0 dB. | |

In FIG. 9, a plurality of couplers 91 of the kind shown in FIG. 6 non-invasively access a ring main 92. The ring main in each case is inserted into the coupler with its cladding intact, and corresponds to reference numerals 61 and 62 of FIG. 6. The two tap fibres corresponding to reference numerals 63 and 64 are connected respectively to a light source S (having means to modulate the light according to the data to be carried) and a detector D. In each case the couplers are orientated such that light injected by the various sources travels anticlockwise (in the view shown in FIG. 9) around the single fibre ringmain, this also being the direction which can be picked up for transmission to the detectors.

FIG. 10 shows diagrammatically how the invention can be used to feed and access a bidirectional communications link in the form of a duplex fibre 101, 102. This requires two devices 103, 104 according to the invention, one to access the up fibre 101 and the other to access the down fibre 102, and they each operate precisely as described above for those accessing the ring main, each having its own source S and detector D. However, the two detectors and the two sources use a common electrical input 105 and a common electrical output 106 respectively, and are thus most conveniently formed into a single unit as indicated by the hatched line 107.

FIGS. 9 and 10 both illustrate a significant advantage over previously known invasive couplers. In the latter, where the main fibre is chopped, terminated and the terminated ends inserted into a coupler, any malfunction occurring at any one coupler can affect the whole ring main or data bus, generally leading to a total shut down of the whole system. Devices of the present invention are non-invasive, so the complete fibre continues through the coupler, and should the latter become loose or otherwise fail, the remainder of the ring main (or data bus) with its accessing stations can continue to function amongst themselves. Similarly additional stations can be coupled into the main fibre without interrupting service to those already in operation.

We claim:

1. A device for optically coupling a main optical fibre comprising a core surrounded by cladding of lower refractive index, and having a protective layer surrounding of the cladding, to at least one tap fibre having a light receptive portion in the form of an exposed end face, the device comprising means to hold an intermediate portion of the main fibre with cladding and protective layer intact and to conform it to a predetermined path which executed a bend having a radius of curvature sufficiently small to cause some of any light flowing through the main fibre to leak from the cladding around the outer surface of the bend, the holding means comprising means to hold the end portion of the tap fibre with its end portion adjacent the outer surface of the bend to receive a least a portion of the light leaking from the cladding around the outer surface of the bend, in which the means for holding the main fibre comprises a first assembly having a mating surface positioned with respect to said predetermined path such that the cladding on the outer surface of the bend in the main fibre-lies flush with the mating surface, and the means for holding the tap fibre comprises a second assembly lockable against the mating surface in a predetermined position wherein the light receptive portion of the tap fibre is positioned to receive at least a portion of the light leaking from the cladding around the outer surface of the bend in the main fibre, and including a stripping blade fixed to the second assembly which blade can be slid along the mating surface to strip a portion of the protective layer from the outer surface of the bend which is proud of the mating surface to expose the cladding as the second assembly is moved to its lockable position.

2. A device as claimed iun claim 1 wherein the second assembly is locked in the predetermined position by sliding it along the mating surface, the stripping blade being located ahead of the tap fibre in the direction of sliding whereby stripping of any protective layers proud of the mating surface is effected automatically when locking the two assemblies together.

3. A device as claimed in claim 1 comprising means to hold two tap fibres with their exposed and faces adjacent to the outer surface of the bend in the main fibre but positioned substantially symmetrically with respect to said bend thereby to enable each to receive light travelling along the main fibre in the opposite direction and that received by the other fibre.

4. A device as claimed in claim 1 wherein the exposed end face is set out at an angle 15° −35° to the main axis of the tap fibre it terminates.

* * * * *